March 27, 1973 MOTOKI KOJIMA ET AL 3,723,111

METHOD OF GROUNDING FOR AN ELECTRONIC PHOTOSENSITIVE PLATE

Filed Dec. 23, 1970

Motoki Kojima, Etsuro Ochiai
and Yuji Katayanagi
INVENTORS

BY

Bierman & Bierman
ATTORNEYS.

3,723,111

METHOD OF GROUNDING FOR AN ELECTRONIC PHOTOSENSITIVE PLATE

Motoki Kojima, Tokyo, Eturo Ochiai, Sagamihara, and Yoji Katayanagi, Tokyo, Japan, assignors to Konishiroku Photo Industry Co., Ltd.

Filed Dec. 23, 1970, Ser. No. 101,032
Int. Cl. G03g *13/02, 15/02*
U.S. Cl. 96—1 C 3 Claims

ABSTRACT OF THE DISCLOSURE

An improved method of grounding for an electronic photosensitive plate is disclosed. The method is characterized in that the surface of a photoconductive layer in said photosensitive plate comprising at least a conductive supporting base and the photoconductive layer, is partially grounded.

The present invention relates to a method of grounding for an electronic photosensitive plate.

In the so-called Karlson process consisting of the steps of charging an electronic photosensitive plate, irradiating said electronic photo-sensitive plate with an optical image to produce an electrostatic latent image, developing said latent image into a visible image, transferring, if necessary, said visible image to another supporting base, and fixing the same; generally as said electronic photosensitive plate to be employed in said process, a supporting base having a specific resistance lower than $10^{12}\Omega$ cm. such as a paper sheet, an aluminum plate, etc. has been used, and sometimes the same supporting base was piled with a photoconductive layer thereon via an intermediate layer having a higher specific resistance.

Figure 1:
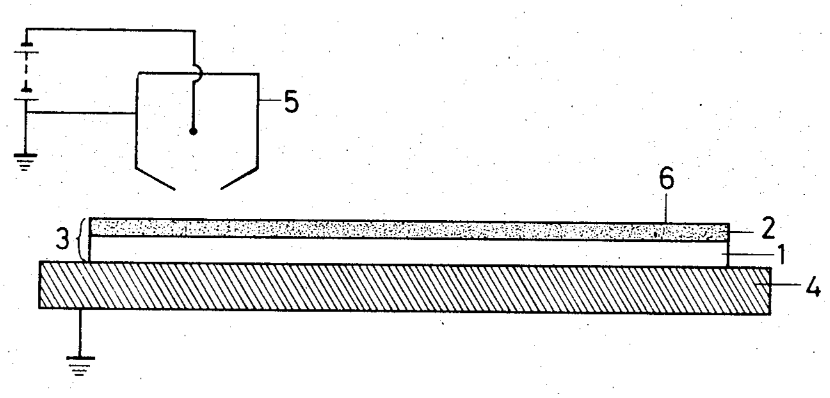

As the method of grounding for such an electronic photo-sensitive plate, various methods have been known. As a representative one, there is a method of grounding by bringing the back surface of a supporting base 1 of an electronic photosensitive plate 3 consisting of said supporting base 1 having a specific resistance lower than $10^{12}\Omega$ cm. and a photoconductive layer 2 piled thereon, in tight contact with a grounded conductive substrate 4, which extends over the entire back surface of said supporting base 1, as shown in FIG. 1. In this case, in order to charge the electronic photosensitive plate to impose it a photosensitivity, a high voltage is applied to a charger 5 to produce a corona discharge and thereby the surface 6 of said photosensitive plate is caused to be charged uniformly in accordance with the scanning of said charger. Then the corona discharge current is led to the ground via the photoconductive layer 2, the supporting base 1 and the conductive substrate 4, successively. In this way, the electric charge stored on the surface 6 of said photosensitive plate moves to the supporting base 1 through the low resistance portions obtained by the irradiation with the optical image on having a pattern corresponding to the optical image on the photoconductive layer 2, and is led to the ground via the conductive substrate 4, and thereby an electrostatic latent image can be formed.

However, according to such a prior art method of grounding, uneven charging is caused on the surface 6 of said photosensitive plate due to uneven contact between the conductive substrate 4 and the supporting base 1 of said photosensitive plate, resulting in unevenness in the picture image (the visible image) to be obtained after development. Alternatively, when paper or hydrophilic polymer such as cellophane, polyvinyl alcohol, etc. is employed as the supporting base 1, variations in the resistance value occur because of instability with respect to a temperature and a humidity, which deteriorates the aging stability and the uniformity of the picture image to be obtained after development. Further in case that a low specific resistance supporting base such as a metallic plate consisting of aluminum or the like is employed, then there are disadvantages that the photoconductive layer may possibly break down due to the too large current flowing through the photo-conductive layer upon charging said photosensitive plate and thereby the successively repeated use thereof may become impossible, and that the flexibility of said electronic photosensitive plate is poor and consequently the mechanical operations thereof is difficult.

On the other hand, there has been known another method of grounding, which obviates the uneven grounding of the electronic photosensitive plate and yet maintains the flexibility of said photo-sensitive plate, by employing an electronic photo-sensitive plate formed through the steps of providing a flexible supporting base of low specific resistance including a supporting base consisting of a polymer film as of, for example, cellulose acetate, polyester, polystyrene, etc. or a paper sheet and a low specific resistance layer obtained by evaporation or sticking of a layer of aluminum, tin, etc., or titanium oxide or copper iodide onto said supporting base, and piling a photo-conductive layer on the side of the low specific resistance layer, if necessary, with an intermediate layer having a high specific resistance therebetween, and by grounding said low specific resistance layer. However, even with such a method it is impossible to eliminate the disadvantages such as the break down of the photoconductive layer and the lowering of the charged potential, and especially in order to ground said low specific resistance layer, said low specific resistance layer must be exposed to enable grounding in the stage of manufacture of said photosensitive plate or in the stage of use of the same, these operations being very inconvenient and also difficult.

One object of the present invention is to provide a novel method of grounding, which entirely eliminates these disadvantages in the prior art.

That is, according to the present invention, through the step of partially grounding the surface of a photoconductive layer of an electronic photosensitive plate which consists of at least a conductive supporting base and the photoconductive layer, the operations can be made very simply, the break down of the photoconductive layer, the lowering of the charged potential, the effect of the selected supporting base, the uneven grounding, etc. may be eliminated, and also the successively repeated use of the same is made possible.

In addition, according to the present invention, since the grounding for an electronic photosensitive plate is made through a part of the surface on the light receiving side of the photoconductive layer, there is no need to make grounding from the back surface or the side surface of the conductive supporting base as is the case with the prior art, and consequently, there never occurs leakage through such surface portions.

Figure 2:
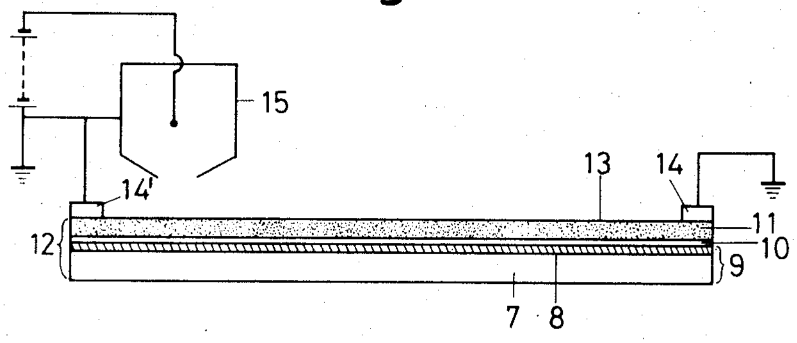

These and other objects and advantages of the present invention will become apparent from the following specification taken in conjunction with the preferred embodiment illustrated in the drawing, wherein:

FIG. 1 is a cross-section view illustrating the method of grounding for an electronic photosensitive plate in the prior art, and FIG. 2 is a cross-section view illustrating one preferred embodiment of the method of grounding for an electronic photosensitive plate according to the present invention.

Referring now to the accompanying drawings, FIG. 2 shows one preferred embodiment of the present invention; in which an electronic photosensitive plate 12 is employed such that a photoconductive layer 11 is piled, if necessary via an intermediate layer 10 having a high specific resistance, on a conductive supporting base 9 forming said low specific resistance flexible supporting base provided with a low specific resistance layer 8 on a supporting base 7 as of a polymer film or a paper sheet, or if desired, on a conductive supporting base 9 consisting of a low specific resistance supporting base such as an aluminum plate or a supporting base having a relatively low specific resistance lower than $10^9\Omega$ cm. and made of paper or hydrophilic polymer; and in which on a part of the surface 13 of the photoconductive layer 11 of said photosensitive plate 12, grounded conductor plates 14 and 14' are brought into tight contact therewith to ground said photosensitive plate, said conductor plates 14, 14' consisting of metal such as aluminum, conductive rubber, a paper sheet or a plastic sheet processed by hydroscopic agent or an activator to have a specific resistance value lower than $10^9\Omega$ cm., or a conductive adhesive tape. Said conductor plates 14 and 14' may be preliminarily stuck on a part of the surface 13 of the photoconductive layer 11 as by means of a conductive paste, or else aluminum or the like may be evaporated onto a part of the surface 13 of the photoconductive layer 11 and then other grounded conductive plates or conductive pieces may be brought in tight contact therewith to ground said photosensitive plate. Alternatively, a grounded pressure plate having a lot of sharp extremities may be brought in press contact with a part of the surface 13 of the photoconductive layer 11. Therefore, in the method of grounding according to the present invention, in order to charge, for instance, the electronic photosensitive plate 12, a high voltage is applied to the charger 15 to produce a corona discharge and said charger is moved while scanning. Then the corona discharge current is led through the photoconductive layer 11, the conductive supporting base 9, the photoconductive layer 11 again, and the conductive plates 14 and 14' successively, to the ground. In this way, the photoconductive layer 11 is interposed between the conductive supporting base 9 and the conductive plates 14 and 14', this photoconductive layer being believed to function as a good resistor, and thus it is believed that the break down of the photoconductive layer caused by the too large corona discharge current may be suppressed by such a structure. Thus the electric charge can be stored uniformly on the photoconductive layer without being affected by the properties of the supporting base.

Explaining the present invention in more detail, when an aluminum plate and a sheet consisting of a polyester film stuck with an aluminum film were employed as conductive supporting bases, respectively, and on the surface of a photoconductive layer in an electronic photosensitive plate $B_4$ size provided with a zinc oxide photoconductive layer of $12\mu$ in thickness on said each conductive supporting base, was brought in press contact therewith in the direction of the shorter edges of said photosensitive plate one piece of grounded conductive plate of aluminum having a width of 5 mm., after charged, exposed and developed they both proved to have no uneven charging due to uneven grounding and thus excellent picture images could be obtained. Still further, even if the above-mentioned photosensitive plates were successively repeatedly used, always uniform picture images after development could be obtained, since no break down occurred in the photosensitive layer and also since there is no lowering of the charged potential.

Then, even if a conductive paper sheet or conductive rubber piece having a width of 10 mm. and a specific resistance of $10^5$–$10^9\Omega$ cm. were used as the piece of conductivce plate instead of the aluminum plate, similar results could be obtained. Furthermore, even when the subject invention was practiced similarly to the above except for the point that a conductive supporting base formed by evaporating aluminum onto a polyester film was used as said conductive supporting base, the same results could be obtained.

On the other hand, when the present invention was practiced similarly to the above by bringing a grounded conductive plate of aluminum having a width of 10 mm. in press contact with the surface of a photosensitive layer in an electronic photosensitive plate of $B_4$ size along its four edges, said photosensitive plate being formed by providing a zinc oxide photoconductive layer of $12\mu$ in thickness as piled on a base paper sheet having a specific resistance of $10^6\Omega$ cm. in the atmosphere at 20° C. and at a relative humidity of 60%, a good result could be obtained.

According to the present invention, owing to the fact that the grounding is made only through a part of the surface of the photoconductive layer in the electronic photosensitive plate, the operations can be carried out in a simple manner, it is possible to obtain always a stable picture image after development even if a supporting base sensitive to a temperature and a humidity is employed, a uniform result can be obtained even with a flexible supporting base employed, in addition no break down of the photoconductive layer occurs, and there is no lowering of the charged potential because the dark decay current is extremely small, so that the invention enables the successively repeated use of an electronic photosensitive plate and no deterioration of the quality of a picture image after development due to the successively repeated use can be recognized.

While the electrodes 14 and 14' are provided on the surface of the photoconductive layer 11 for flowing an electric current from said surface to the ground in the above-described embodiment, alternatively lead wires extending to the ground may be brought into direct contact with the surface of the photoconductive layer 11 without employing the electrodes 14 and 14'. Furthermore, although only conductor strips provided on the photoconductive layer along its opposite edges are illustrated as said electrodes, various shape of electrodes may be equally employed, and, for instance, a conductive roller brought in press contact with a part of the surface of the photoconductive layer may be employed as the electrode while it is turned in travelling on said surface, with the same effect and advantage as the above-described strip-shaped electrode.

In addition, it is to be noted that the conductive supporting base used according to the present invention may include an insulating tape having a conductive layer (specific resistance: lower than $10^{12}\Omega$ cm.) thereon. Also upon piling the photoconductive layer 11 on the conductive supporting base 9, an intermediate layer having a high specific resistance (for example, a casein layer) may be interposed therebetween. In the case of such type of photosensitive sheets, the method of grounding according to the present invention is also applicable.

What is claimed is:

1. A method of grounding the entire photoconductive layer of an electronic photosensitive plate of the type having a photoconductive layer and a conductive supporting base during corona charging or exposure of said plate consisting of the step of placing a grounded conductive element in direct contact with the surface of the photoconductive layer during said corona charging or exposure to provide a current path from the surface of the photoconductive layer through said layer to the conductive base and back to said photoconductive layer.

2. The method according to claim 1 wherein said grounded plate comprises at least one conductive strip, comprising the step of placing said strip along the edge of said photoconductive layer and in contact with the surface thereof.

3. The method according to claim 1 providing that the specific resistance of said conductive supporting base is less than $10^{12}\Omega$ cm.

References Cited

UNITED STATES PATENTS

| | | | |
|---|---|---|---|
| 3,552,957 | 1/1971 | Hodges | 96—1.5 |
| 3,248,216 | 4/1966 | Weigl | 96—1 R |

| | | | |
|---|---|---|---|
| 3,005,707 | 10/1961 | Kallmann et al. | 96—1 R |
| 2,599,542 | 6/1952 | Carlson | 96—1.5 |
| 2,836,766 | 5/1958 | Halsted | 96—1.5 X |
| 2,765,385 | 10/1956 | Thomsen | 117—201 X |
| 3,684,503 | 8/1972 | Humptrriss et al. | 96—1.5 |

CHARLES E. VAN HORN, Primary Examiner

U.S. Cl. X.R.

96—1.5, 1.8; 117—201; 250—49.5 ZC; 317—262 A